United States Patent [19]

Moll et al.

[11] 3,993,789
[45] Nov. 23, 1976

[54] RED PIGMENT AND PROCESS

[75] Inventors: Hans Rudolf Moll; David Robert Farr, both of Vaud, Switzerland

[73] Assignee: Societe d'Assistance Technique pour Produits Nestle S.A., Lausanne, Switzerland

[22] Filed: Oct. 16, 1975

[21] Appl. No.: 623,054

[30] Foreign Application Priority Data
Nov. 7, 1974 Switzerland.................. 14887/74

[52] U.S. Cl. ............................... 426/250; 426/540; 260/287 R; 260/295 T; 536/55
[51] Int. Cl.² ................. A23L 1/27; A23L 1/275
[58] Field of Search................. 426/250, 265, 540; 260/287 R, 295 T, 211 R

[56] References Cited
UNITED STATES PATENTS 3,765,906  10/1973  Yamaguchi et al............... 426/540
3,911,141  10/1975  Farr................................. 426/540

*Primary Examiner*—Jeanette M. Hunter
*Attorney, Agent, or Firm*—Watson Leavenworth Kelton & Taggart

[57] ABSTRACT

A red colorant having the general formula

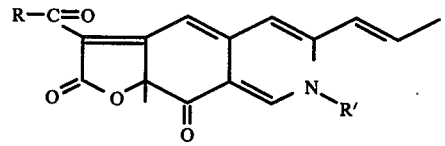

in which
R represents an aliphatic radical, and
R' represents the radical of a compound of the formula $H_2N-R'$, which compound is an amino sugar, a polymer of an amino sugar, a polyamino acid or an amino alcohol.

13 Claims, No Drawings

RED PIGMENT AND PROCESS

This invention relates to a red colorant and to a process for its production from a pigment of a microorganism of the genus Monascus.

Microorganisms of the genus Monascus, for example, M. purpureus, M. rubropunctatus, M. rubiginosus or M. rubra, produce yellow, orange or red pigments in a culture medium. The structures of at least three pigments from Monascus species have been described, namely rubropunctatin, monascorubrin and monascoflavin. Pigments from a Monascus species are substantially insoluble in water but, since they are able to attach themselves to proteins, a soluble pigment can be prepared by binding to a soluble protein, amino acid or peptide. Unfortunately, binding to a protein is indefinite insofar as it is not known to what amino acid the pigment attaches itself and what are the properties of the pigment/unknown amino acid complex.

In the search for colorants suitable for use in the food industry, it is important to know exactly the structure of the pigments in order to be able successfully to examine the question of tolerance by the human organism.

An object of the present invention is to provide a red colorant of well-defined structure and, more especially, a colorant which can be safely tolerated by the human organism.

The present invention provides a colorant having the general formula.

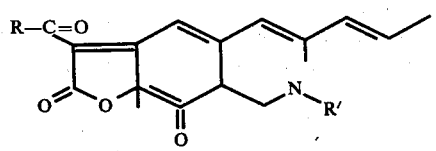

in which
R is an aliphatic radical, and
R' represents the radical of a compound of the formula $H_2N-R'$, which compound is an amino sugar, a polymer of an amino sugar, a polyamino acid or an aminoalcohol.

The invention also provides a process for the preparation of a colorant as defined above which comprises reacting an orange-yellow Monascus pigment with a reactive substance which is an amino sugar, a polymer of an amino sugar, a polyamino acid or an aminoalcohol, to form a red-coloured chemical compound.

It has been found that, in the first place, the pigment, isolated from Monascus rubiginosus, which attaches itself to the support with which the reaction takes place, has an orange-yellow colour and the following structure before the reaction:

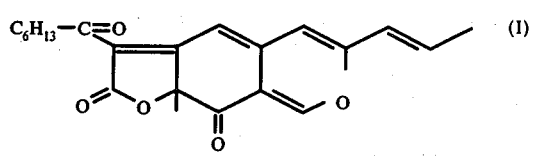

secondly the reaction takes place with a free amino group of the support in accordance with the following scheme

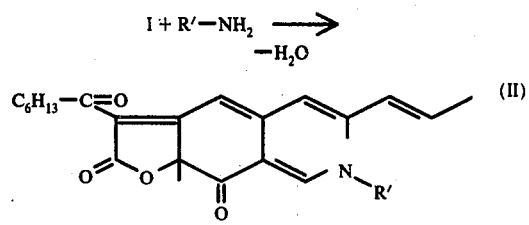

thirdly the reaction only takes place with a free primary amino group of the aliphatic type which is incapable of entering into mesomerism, as shown for example by the negative results of test reactions carried out with purine and pyrimidine bases, nucleotides, nucleosides, RNA, DNA, acetylated amino sugars, urea and chitin.

The orange-yellow pigment may be obtained, for example in pure crystalline form, by subjecting a mycelium of Monascus rubiginosus to extraction with methylene chloride, filtering the concentrated extract on a column of silica gel with chloroform as eluant and by concentrating and crystallising from ethanol the chloroform fraction containing the pigment. The reaction may be carried out for example by adding to 10 parts of an aqueous solution or suspension containing a few percent of the selected support 1 part of ethanol containing in solution a few parts per thousand of orange-yellow pigment. The reaction is accompanied by a marked displacement towards red of the UV-absorption band of greater wavelength which makes the pigment appear quite red. The mixture turns deep red in colour in less than an hour. The reaction may readily be followed by thin-layer chromatography using as solvent a mixture of chloroform, methanol and acetic acid in a ratio of 93:7:5. The orange yellow point will migrate with an $R_f$-value of approximately 0.9, whilst the red compound may have an $R_f$-value of less than 0.5.

The solubility of the colorant is governed by the more or less hydrophilic nature of the radical R' in formula II.

A preferred form of the colorant according to the invention is that in which R' represents the radical of chitosane if the latter is expressed by the formula $H_2N-R'$, because there are significant advantages in using chitosane as reactive substance, i.e. as support for the Monascus pigment. The first advantage is that chitosane does not appear to be metabolised by the human organism. A colorant of this kind would pass through the entire digestive tube without any modification and, accordingly, could not involve any risk of toxicity. Another advantage is that chitosane, either as such or in acetylated form as chitin, is abundant in nature, whether in the skeletons of animals, for example in lobster shells, or in the cellular walls of green algae or mushrooms.

The invention is illustrated by Examples 1 to 5 below.

EXAMPLE 1

20 g of commercial-grade chitosane in flake form are dissolved in 1 litre of 10 % acetic acid and the resulting solution left standing for 12 hours at ambient temperature. The solution obtained is centrifuged to eliminate the undissolved fragments. The chitosane is re-precipitated in finely divided form by forcing it through a 2 mm diameter nozzle opening into a volume of 3 liters of an alkaline solution of pH 11. The pH-value is kept at 11 by the addition of 40 % NaOH.

The voluminous precipitate is centrifuged and washed three times with distilled water. It is then suspended in 1 liter of distilled water. This is followed by the addition of 200 mg of orange-yellow *Monascus* pigment dissolved in 100 ml of ethanol. The white chitosane suspension turns dark red in colour in the space of about 30 minutes. The mixture is stirred for several hours, centrifuged and washed with distilled water. One part is kept in suspension in water whilst the other is dried with alcohol.

EXAMPLE 2

31 g of chitosane are suspended in 2 liters of distilled water. A saturated solution of 500 mg of orange-yellow *Monascus* pigment in ethanol is prepared. The pigment solution is added dropwise with stirring to the chitosane suspension. The suspension gradually turns dark red. The pigment is completely bound by the chitosane, i.e. in a proportion of 1.6 % by weight. The reaction product is washed three times with distilled water with the aid of centrifuging. Part of this red chitosane is lyophilised. The lyophilised and non-lyophilised parts are examined by means of a "Colormaster" colorimeter. The results of the measurements are put into quantitative form with the aid of the tables of the ICI-International Commission of Illumination, the following values being obtained:

|  | luminosity [%] | Dominant wavelength [nm] | Purity [%] |
| --- | --- | --- | --- |
| Red chitosane, dry (lyophilised) | 8.45 | 592.3 | 42.2 |
| Red chitosane, wet (non-lyophilised) | 0.70 | 606 | 70 |

EXAMPLE 3

500 mg (1.31 mmoles) of monascorubrin are dissolved in 100 ml of ethanol, followed by the addition of 83 $\gamma_n$ (1.38 mmoles) of ethanolamine. The solution is then left standing for several hours at ambient temperature away from air and light. The solvent is evaporated in vacuo and the residue dried over sulphuric acid in a desiccator. 588 mg of a very deep red crystallisate are obtained. This is purified by recrystallisation from a mixture of ethanol and water.

EXAMPLE 4

500 mg (1.31 mmoles) of monascorubrin, 285 mg (1.32 mmoles) of glucosamine hydrochloride and 25 mg (approximately 3 mmoles) of bicarbonate of soda are stirred at ambient temperature in the absence of air and light in a mixture of 50 ml of ethanol and 50 ml of water. The progress of the reaction is reflected in the gradually deepening red colour of the reaction mixture. After 10 hours, the reaction is over and thin-layer chromatography no longer reveals any spot corresponding to monascorubrin. The solvent is then removed by evaporation in vacuo. A very deep red residue is obtained which is insoluble in ether and chloroform but soluble in ethanol and water.

EXAMPLE 5

A colorant is prepared in the same way as described in Example 4, except that 285 mg (1.32 mmoles) of galactosamine hydrochloride are used instead of the glucosamine hydrochloride. The colorant obtained has the same properties as the colorant of Example 4.

Examples 6 to 10 below illustrate the uses and advantages of the colorant according to the invention.

EXAMPLE 6

To prepare a well coloured meat substitute, 190 g of fat-free soya flour and 10 g of dry red chitosane obtained in accordance with Example 2 are dry-mixed for 30 minutes. 28 % by weight of water are added to the resulting mixture. The moistened mixture is then cooked in an extruder under a pressure of 25 kg/cm$^2$ and at a temperature which reaches 162.5° C at the centre of the extruder.

The porous expanded, i.e. textured, product obtained at the output end of the extruder has a pleasant red colour similar to that of meat. Its characteristics, as determined in accordance with Example 2, are as follows:

| luminosity [%] | dominant wavelength [nm] | purity [%] |
| --- | --- | --- |
| 8.99 | 590 | 38 |

EXAMPLE 7

A well coloured meat substitute is prepared in the same way as described in Example 6, except that 10 g of wet red chitosane obtained in accordance with Example 2 are used instead of the dry red chitosane. The product obtained has colour qualities similar to those of the product described in Example 6. Its characteristics, determined in the same way as before, are as follows:

| luminosity [%] | dominant wavelength [nm] | purity [%] |
| --- | --- | --- |
| 4.28 | 592 | 41.8 |

EXAMPLE 8

Natural commercial-grade yoghurts are coloured by mixing with them the dry red colorant obtained in accordance with Example 2, i.e. dry red chitosane containing 1.6 % of pigment. Three parallel tests are conducted with different concentrations of colorant in the yoghurt, namely 0.2, 0.5 and 1 % by weight. The products obtained are compared with natural commercial-grade products, strawberry and raspberry yoghurts. The yoghurt containing 0.5 % of colorant comes closest in colour to the natural products. The yoghurt containing 0.2 % appears light, whilst the yoghurt containing 1 % of colorant appears dark. The colour of the yoghurt containing 0.5 % of red chitosane appears more natural than that of a yoghurt coloured with a conventional red colorant.

A colorimetric examination carried out in accordance with Example 2 gives the following results:

| Type of yoghurt | luminosity [%] | dominant wavelength [nm] | purity [%] |
| --- | --- | --- | --- |
| Natural | 71.2 | 573 | 11.6 |
| Raspberry | 49.4 | 610 | 6.3 |
| Strawberry | 48.6 | 593 | 13.0 |
| Natural + red chitosane in a concentration of | | | |
| 0.2 % | 50.6 | 594 | 14.4 |
| 0.5 % | 40.6 | 598 | 20.0 |
| 1 % | 32.6 | 600 | 26.5 |

EXAMPLE 9

To prepare a pleasantly red-coloured aperitif from a white vermouth, red colorant obtained in accordance with Example 3, i.e. N-(β-hydroxyethyl)-monascamine or red ethanolamine, soluble in alcohol, is incorporated in the vermouth. The crystals of colorant are first dissolved in a small quantity of ethyl alcohol. Different quantities of this concentrated solution are added to equal quantities of white vermouth in order to obtain different concentrations, ranging from about $10^{-3}$ to $10^{-2}$ % by weight, of colorant in the aperitif. The samples are examined with the aid of a "Colormaster" colorimeter and the ICI tables, the following results being obtained:

| Concentration in mg of red ethanolamine per 100 ml of white vermouth | luminosity [%] | dominant wavelength [nm] | purity [%] |
| --- | --- | --- | --- |
| 0 | 100 | 576.5 | 2.3 |
| 1 | 71.8 | 574.5 | 40.2 |
| 2 | 56.6 | 594.5 | 41.5 |
| 4 | 38.5 | 596.4 | 70.0 |
| 6 | 28.3 | 598.8 | 87.0 |
| 10 | 21.9 | 601.8 | 95 |

EXAMPLE 10

In order to prepare a pleasantly red-coloured non-alcoholic aperitif, red colorant obtained in accordance with Example 5, i.e. N-(2-galactosyl)-monascamine or red galactosamine, is incorporated in a naturally-carbonated gaseous mineral water. The colorant is added to the water while stirring for a few seconds at ambient temperature. Interesting results are obtained with concentrations of colorant in the carbonated water of the order of a few parts per thousand (by weight). The characteristics of a few samples, determined in the same way as before, are as follows:

| Concentration in mg of red galactosamine per 100 ml of carbonated water | luminosity [%] | dominant wavelength [nm] | purity [%] |
| --- | --- | --- | --- |
| 100 | 87.7 | 586 | 5 |
| 150 | 79.6 | 586.1 | 8.5 |
| 200 | 71.9 | 587.7 | 12.6 |
| 300 | 54.5 | 590 | 22.7 |

We claim:
1. A red colorant having the general formula

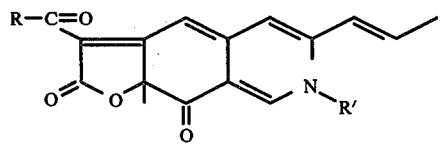

in which
R represents an aliphatic radical, and
R' represents the radical of a compound of the formula $H_2N-R'$, which compound is an amino sugar, a polymer of an amino sugar, a polyamino acid or an amino alcohol.

2. A red colorant as claimed in claim 1, wherein R' represents the radical of chitosane where chitosane is expressed by the formula $H_2N-R'$.

3. A red colorant as claimed in claim 1, wherein R' represents the radical of ethanolamine where ethanolamine is expressed by the formula $H_2N-R'$.

4. A red colorant as claimed in claim 1, wherein R' represents the radical of a hexosamine where the hexosamine is expressed by the formula $H_2N-R'$.

5. A red colorant as claimed in claim 1, wherein R' represents the radical of glucosamine where glucosamine is expressed by the formula $H_2N-R'$.

6. A red colorant as claimed in claim 1, wherein R' represents the radical of galactosamine where galactosamine is expressed by the formula $H_2N-R'$.

7. A process for the preparation of a colorant as defined in claim 1 from a pigment of a microorganism of the genus Monascus, which comprises reacting an orange-yellow Monascus pigment with a reactive substance which is an amino sugar, a polymer of an amino sugar, a polyamino acid or an aminoalcohol, to form a red-coloured chemical compound.

8. A process as claimed in claim 7, wherein the reactive substance is chitosane.

9. A process as claimed in claim 7, wherein the active substance is ethanolamine.

10. A process as claimed in claim 7, wherein the reactive substance is a hexosamine.

11. A process as claimed in claim 7, wherein the reactive substance is glucosamine.

12. A process as claimed in claim 7, wherein the reactive substance is galactosamine.

13. A method of colouring a foodstuff which comprises adding to the foodstuff a red colorant as claimed in claim 1.

* * * * *